Inventor
Anton Gmeinder

Patented Nov. 24, 1936

2,061,701

UNITED STATES PATENT OFFICE 2,061,701

CLUTCH CONTROL MECHANISM

Anton Gmeinder, Mosbach, Germany

Application October 15, 1932, Serial No. 637,899
In Germany October 21, 1931

3 Claims. (Cl. 192—82)

This invention relates to improvements in change speed gears of the type in which, instead of a main friction coupling on the engine shaft, each speed stage is provided with a coupling. The object of the present invention is to simplify the construction of such change speed gears, render them easier to operate and provide means for proper take up to compensate for wear and tear in the coupling members, even should this wear and tear be different in each of the couplings belonging to the various stages of the speed change gear.

In change speed gears employing friction couplings for each stage of the change gear, it is usual to have springs within each coupling case by which the friction members, such as discs, laminae or the like, are held in operative engagement with a force corresponding to the power to be transmitted. For the purpose of disengaging, the tension of the spring must be overcome, as in the case of all the usual couplings provided on automobiles. When, in such a device, the couplings for two or more stages are operated from a single lever, all the springs must be compressed to a sufficient degree to relieve the frictional force. This entails that it is necessary to apply to the control lever a very great force, which of course soon causes the driver to become tired under modern traffic conditions. Further the forms hitherto known involve that all the link joints of the control gear are under heavy load and consequently become worn by the unavoidable, even if small, movements.

According to this invention, the separate coupling cases for each stage are free of springs for holding the friction members in operative engagement and springs means are introduced in the rod and lever mechanism of the control gear. A separate spring may be so introduced for each speed stage or one spring device may be arranged to operate for more than one coupling. The invention also comprises various other constructional features which will be more clearly understood from the following description made with reference to the accompanying drawings which show two embodiments of this invention by way of example:—

In carrying the invention into effect two disc couplings are employed with the outer coupling casings $a$ and $b$ respectively. The coupling discs $a^1$ and $b^1$ are fixed respectively to the coupling casings $a$ and $b$, whilst the coupling discs $c^2$ and their carrying plates $c^1$ are fixed to the coupling naves $c$ and $d$. The naves or inner coupling parts $c$ and $d$ are keyed to the lay shaft $e$, whilst the coupling friction members are mounted in the coupling casings $a$ and $b$ which are free to rotate on the lay shaft, either set of friction members, $a^1$ or $b^1$, being driven according to whether the coupling A or the coupling B is in engagement.

Figure 2:
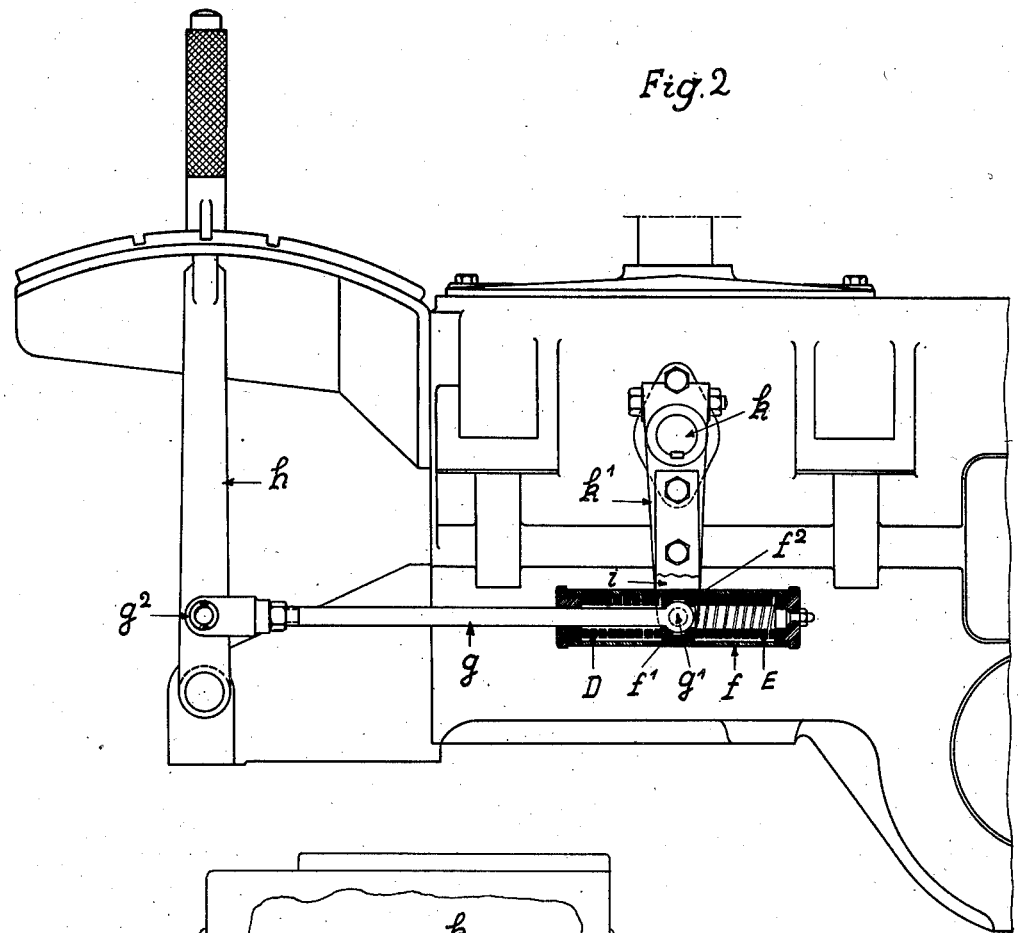
Figure 2 is a diagrammatic side view of the control gear for the improved change speed gear.
Figure 3:
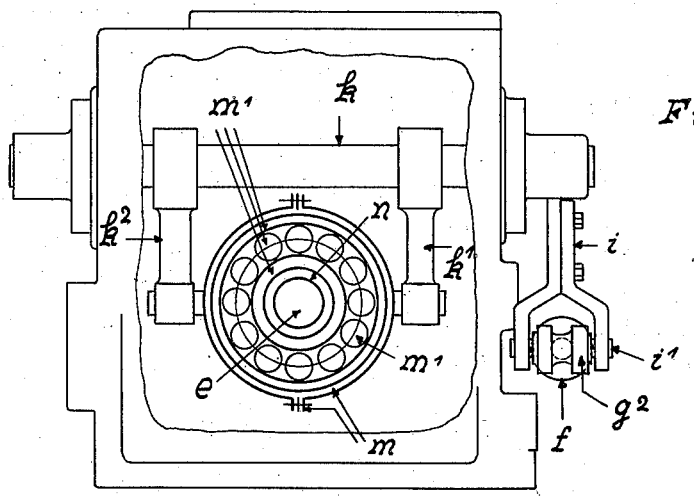
Figure 3 is a diagrammatic end view of the control gear shown in Figure 2.

The construction, so far as described is known. A novel feature is the arrangement of the springs which effect the frictional engagement of the friction discs or like members $a^1$ and $c^1$ or $b^1$ and $c^1$, which are not, as hitherto usual, arranged inside the casing of the coupling, which is thus free of the usual springs, but are disposed outside in such a manner that the two springs D and E (see Fig. 2) abut at one of their ends in the intermediate casing $f$, whilst their adjacent ends abut on the end $g^1$ of the rod $g$ through intermediate pressure washers or like members $f^1$ and $f^2$. The portion of the rod $g$ on which the washers $f^1$ and $f^2$ act, and indicated by the reference letter $g^1$ is preferably spherical so as to ensure a good bearing. The rod $g$ is connected at $g^2$ by a suitable link to the control lever $h$. The lever arrangement is completed through the lever $i$, which engages pintel pins $i^1$ on the exterior of the intermediate casing $f$. The lever $i$ as well as pressing levers $k^1$ and $k^2$ are firmly keyed to the cross shaft $k$. These levers $k^1$ and $k^2$ are connected by suitable links to the coupling sleeve $m$, which is mounted with a ball bearing $m^1$ to slide on the shaft $e$ an inner pressing ring member $n$, rotating with the shaft.

The springs D and E are inserted with sufficient initial tension to press the friction members $a^1$, $c^1$ or $b^1$ and $c^1$ together with adequate force corresponding to the power to be transmitted. As the springs are at both ends arranged to abut in the intermediate casing $f$, they cannot transmit any force to the control gear in the position shown in Figure 2. If now the coupling B or the speed stage corresponding thereto be placed in engagement, the hand lever $h$ is moved in the direction of the arrow $y$. The pin $g^1$ then bears on the pressure washer $f^2$. In order to cause the intermediate casing $f$, and also the lever $i$, to swing in the direction of the arrow $y$, force must be applied to the hand lever $h$, and taking into consideration the mechanical advantages of the lever system, coupled to the initial tensioning of the spring, it follows that the friction members of the clutch will be placed together with such applied force and initial tension force of the spring.

When the sliding movement of the friction members $a^1$, $b^1$, $c^1$ relatively to one another is very small, only a small additional force has to be applied to the control lever $h$ in order to bring these friction members into effective engagement. If these friction members are badly worn, a correspondingly greater compression of the spring is necessary. In all cases will be obtained a sufficient clutching force by swinging the hand control corresponding to the spring compression.

The same process occurs when the control lever $h$ is swung in the direction opposite to the arrow $y$. In this case the coupling A is engaged.

The movement of the coupling sleeve $m$ is transmitted to one or other of the clutch pressure plates $q$ through the pressing ring $n$ slidably mounted on the shaft $e$, whereupon the clutch friction members are brought into effective operation to make the drive. During this operation the push ring $n$ bears directly on one or other of the pressure plates $q$.

Figure 1:
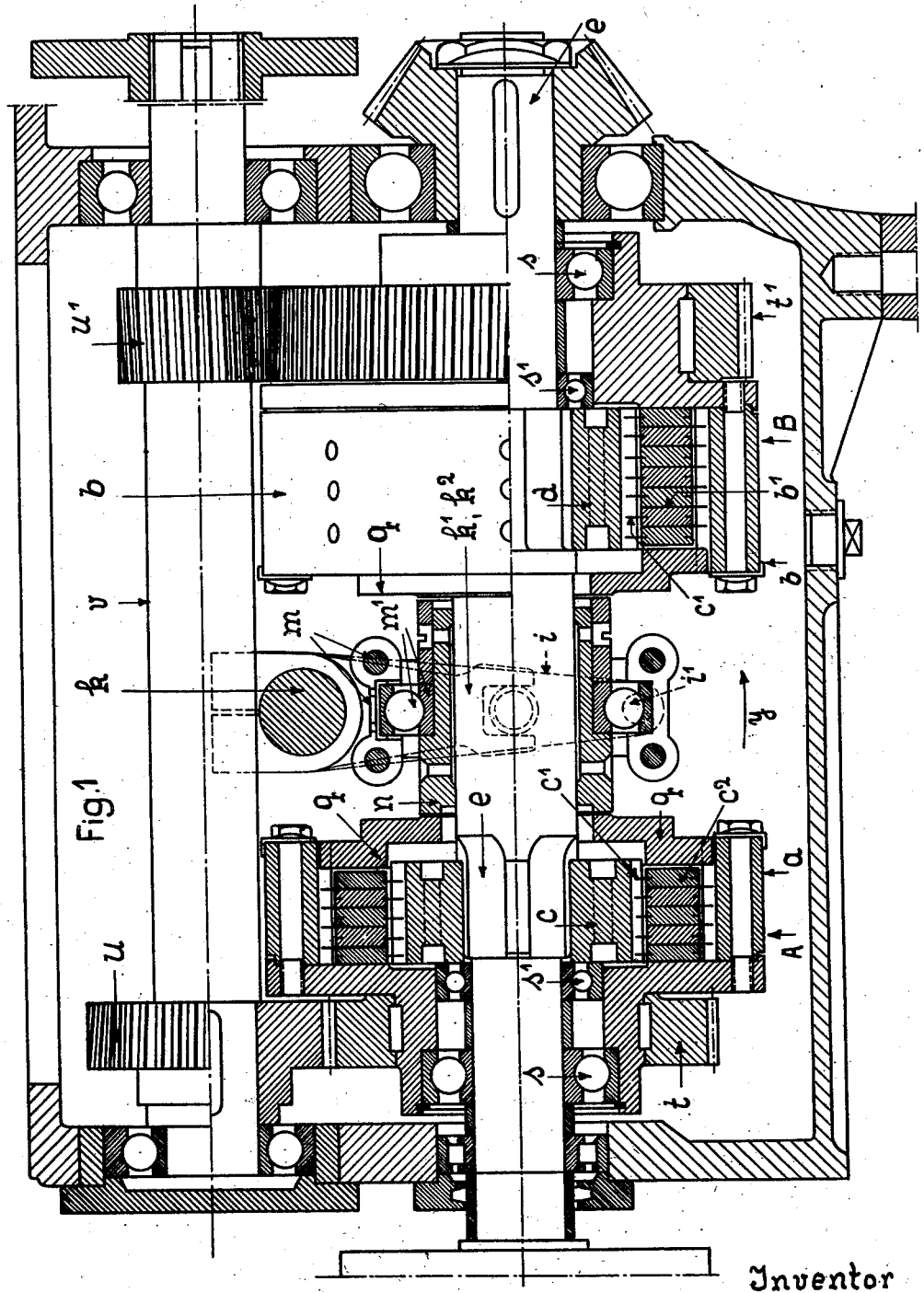
Figure 1 is a vertical section through a change speed gear according to this invention, showing the stage clutch or coupling and the corresponding gear stage.

The support of the coupling or clutch casings $a$, $b$ is effected by the ball bearings $s$, $s^1$ (see Figure 1). The nave of the casings $a$ and $b$ thus is in each case mounted loosely on the shaft $e$ and the usual bronze or guide sleeves are dispensed with.

The toothed wheels $t$, $t^1$ associated with the clutch casings $a$ and $b$ are cut at an inclination so that the side pressure involved by the action of the clutch during working is approximately counteracted and any objectionable friction or heating as far as possible avoided. It may be noted, that the wheels $t$, $t^1$ forming the secondary wheels of the speed gear, are meshing with the primary toothed wheels $u$, $u^1$ respectively, these wheels being keyed to the primary shaft $v$ driven by the motor, not further shown.

What I claim is:

1. Shifting means for a constant mesh gear-train and a frictional coupling comprising a hand lever, a two parted thrusting rod, pressing springs inserted between the two sections of the said thrusting rod and having a precompression gauged to the power to be transmitted by the frictional coupling, a connecting lever and a cross shaft the former being attached to the latter and the outer section of the thrusting rod, which is pivoted with its inner section to the hand lever, pressing levers fixed to the cross shaft, a secondary shaft carrying the friction coupling, an outer and an inner pressing sleeve coaxially arranged on the secondary shaft, the outer sleeve being attached to the free end of the pressing levers and an axial thrusting bearing rotatably connecting with each other the said pressing sleeves, substantially as described.

2. Shifting means for a multi-speed constant mesh gear train and frictional couplings to be moved by the shifting means comprising a hand lever, a two parted thrusting rod, pressing springs inserted between the two sections of the thrusting rod and having a pre-compression gauged to the power to be transmitted by the frictional couplings, a connecting lever and a cross shaft the former being attached to the latter and the outer section of the thrusting rod, which is pivoted with its inner section to the hand lever, pressing levers fixed to the cross-shaft, a secondary shaft carrying the frictional coupling, an outer and an inner pressing sleeve axially arranged between two frictional couplings, the outer sleeve being attached to the free end of the pressing levers and an axial thrusting ball bearing—rotatably connecting with each other the said pressing sleeves adapted to operate either the frictional couplings, substantially as described.

3. Shifting means for a constant mesh gear train and a friction coupling to be moved by the shifting means comprising a hand lever having a fixed fulcrum, a two parted thrusting rod consisting of a casing and a thrusting section the latter being pivoted with its one hand to the hand lever and protruding into the casing, two pretensioned springs arranged within the said casing and abutting with their adjoining ends against the protruding end of the said thrusting section, a connecting lever and a cross shaft the former being attached to the latter and the outer section of the thrusting rod, pressing levers fixed to the cross-shaft, a secondary shaft carrying the frictional coupling, an outer and an inner pressing sleeve axially arranged on the secondary shaft, the outer sleeve being attached to the free end of the pressing levers, and an axial thrusting ball bearing rotatably connecting with each other the said pressing sleeves, substantially as described.

ANTON GMEINDER.